(12) United States Patent
Yeh

(10) Patent No.: US 10,345,928 B2
(45) Date of Patent: Jul. 9, 2019

(54) TOUCH SENSITIVE PROCESSING METHOD, APPARATUS AND SYSTEM FOR CALIBRATING PRESSURE VALUE TO STYLUS

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 117 days.

(21) Appl. No.: 15/448,798

(22) Filed: Mar. 3, 2017

(65) Prior Publication Data

US 2017/0255283 A1    Sep. 7, 2017

Related U.S. Application Data

(60) Provisional application No. 62/302,901, filed on Mar. 3, 2016.

(30) Foreign Application Priority Data

Dec. 30, 2016 (TW) .............................. 105144060 A

(51) Int. Cl.
G06F 3/0354 (2013.01)
G06F 3/041 (2006.01)

(52) U.S. Cl.
CPC ........ *G06F 3/03545* (2013.01); *G06F 3/0418* (2013.01); *G06F 2203/04105* (2013.01)

(58) Field of Classification Search
CPC ............... G06F 3/03545; G06F 3/0418; G06F 2203/041
See application file for complete search history.

(56) References Cited

U.S. PATENT DOCUMENTS

| | | | | |
|---|---|---|---|---|
| 5,977,959 A | * | 11/1999 | Katsurahira | G06F 3/03545 178/19.01 |
| 6,236,740 B1 | * | 5/2001 | Lee | G06K 9/00154 382/100 |
| 6,577,299 B1 | * | 6/2003 | Schiller | G06F 3/0325 345/158 |
| 7,310,091 B2 | | 12/2007 | Liu et al. | |
| 7,847,789 B2 | * | 12/2010 | Kolmykov-Zotov | G06F 3/03545 345/173 |
| 8,941,626 B1 | | 1/2015 | Yeh et al. | |
| 9,250,722 B2 | * | 2/2016 | Leydon | G06F 3/03545 |
| 9,740,312 B2 | * | 8/2017 | Barel | G06F 3/03545 |
| 9,841,828 B2 | * | 12/2017 | Peretz | G06F 3/03545 |

(Continued)

FOREIGN PATENT DOCUMENTS

JP 2006023125 A * 1/2006
TW I222008    10/2004

(Continued)

*Primary Examiner* — Nitin Patel
*Assistant Examiner* — Robert M Stone
(74) *Attorney, Agent, or Firm* — WPAT, PC

(57) ABSTRACT

The present invention provides a touch sensitive processing method for calibrating a pressure value to a stylus. The method includes receiving a pressure value to the stylus; receiving a tilt angle between the shaft of the stylus and a touch screen plane; and calculating a calibrated pressure value based on the pressure value and the tilt angle.

11 Claims, 6 Drawing Sheets

(56) References Cited

U.S. PATENT DOCUMENTS

| | | | | |
|---|---|---|---|---|
| 2005/0057535 A1* | 3/2005 | Liu | G06F 3/03545 | 345/179 |
| 2007/0127096 A1* | 6/2007 | Larsen | G03H 1/0005 | 359/2 |
| 2010/0182284 A1* | 7/2010 | Tremblay | G06F 3/03545 | 345/179 |
| 2012/0127088 A1* | 5/2012 | Pance | G06F 3/016 | 345/173 |
| 2012/0206330 A1* | 8/2012 | Cao | G06F 3/0383 | 345/156 |
| 2012/0253699 A1 | 10/2012 | Kuno | | |
| 2012/0256874 A1* | 10/2012 | Jiyama | G06F 3/0414 | 345/174 |
| 2013/0088465 A1* | 4/2013 | Geller | G06F 3/03545 | 345/179 |
| 2013/0100074 A1* | 4/2013 | Chang | G06F 3/044 | 345/174 |
| 2013/0300719 A1* | 11/2013 | Wang | G06F 3/046 | 345/179 |
| 2013/0307802 A1* | 11/2013 | Tremblay | G06F 3/03545 | 345/173 |
| 2014/0015811 A1* | 1/2014 | Ji | G06F 3/033 | 345/179 |
| 2014/0019070 A1* | 1/2014 | Dietz | G06F 3/03545 | 702/41 |
| 2014/0104191 A1* | 4/2014 | Davidson | G06F 3/04883 | 345/173 |
| 2015/0022468 A1* | 1/2015 | Cha | G06F 3/0416 | 345/173 |
| 2015/0029132 A1* | 1/2015 | Yeh | G06F 3/046 | 345/174 |
| 2015/0153845 A1 | 6/2015 | Chang et al. | | |
| 2016/0154528 A1* | 6/2016 | Ahn | G06F 3/038 | 345/174 |
| 2016/0209984 A1* | 7/2016 | Richards | G06F 3/0418 | |
| 2016/0252981 A1* | 9/2016 | Chang | G06F 3/0383 | 345/179 |
| 2017/0255331 A1* | 9/2017 | Yeh | G06F 3/0416 | |

FOREIGN PATENT DOCUMENTS

| | | |
|---|---|---|
| TW | 201246020 | 11/2012 |
| TW | I503732 | 10/2015 |
| TW | 201543343 | 11/2015 |

* cited by examiner

TOUCH SENSITIVE PROCESSING METHOD, APPARATUS AND SYSTEM FOR CALIBRATING PRESSURE VALUE TO STYLUS

CROSS REFERENCES TO RELATED APPLICATIONS

The present application claims priority to provisional patent application, No. 62/302,901, filed on Mar. 3, 2016 and to Taiwan patent application, No. 105144060, filed on Dec. 30, 2016, the disclosures of which are incorporated herein by reference.

FIELD OF THE INVENTION

The present application is related to a touch sensitive processing method, and more particularly, to a touch sensitive processing method for calibrating pressure values to a stylus.

BACKGROUND OF THE INVENTION

In current touch sensitive systems, several parameters of a stylus are typically obtained. One can be the pressure experienced at the tip of the stylus; a second can be the tilt angle of the stylus; a third can be the pointing direction of the stylus; and a fourth can be the rotation speed of the stylus. The tilt angle herein refers to an angle of the stylus with respect to the surface of a touch panel or touch screen (the term "touch screen" is used hereinafter to refer to both of these devices). The pointing direction of the stylus refers to a direction projected on the touch screen in which the body of the stylus is pointing towards the tip of the stylus. The rotation speed refers to the angular speed of an axis along the body of the stylus towards the tip of the stylus rotating in a clockwise or anticlockwise direction.

Pressure values can be detected by a pressure sensor on the stylus or a pressure sensor on the touch screen. The pressure sensor can be an active element or a passive element. The applicants has previously proposed methods of employing a passive element on a stylus, especially a pressure sensor employing a force sensing capacitor (FSC) or a force sensing resistor (FSR) configured to detect the pressure experienced by the tip of the stylus. The pressure values detected by the stylus can be transmitted by a wired transmission, a wireless transmission or by emitting electrical signals from the tip of the stylus. Various modulation methods can be used for transmitting the pressure values to a controller or an operating system of the touch sensitive system. The touch controller may also be used to detect a pressure exerted on the touch screen by the stylus via a pressure sensor of the touch screen, such as a FSC or a FSR.

One of the methods for detecting the tilt angle is to let a plurality of electrodes of the stylus transmit electrical signals that are the same or different simultaneously or in a time-multiplexed manner. The touch controller then uses electrodes on the touch screen to detect these electrical signals in order to determine a plurality of proximity/touch locations of these electrodes, which are in proximity or touching the touch screen. Since the plurality of electrodes are disposed at various different locations on the stylus, based on two or more proximity/touch locations, the title angle and the pointing direction of the stylus can be determined. Furthermore, based on changes of the plurality of proximity/touch locations corresponding to the plurality of electrodes, the rotation speed of the stylus can be calculated.

In addition, an angular accelerometer, a gyroscope or another device for indicating the posture of the stylus can also be provided on both the stylus and the touch controller. By comparing two postures, the relative pointing direction of the stylus with respect to the touch screen can be known. Moreover, when the touch controller detects a stylus on the touch screen, and when the pressure value at the tip of the stylus is greater than zero, the tile angle of the stylus can also be determined. With the angular accelerometer or gyroscope provided on the stylus, the above rotation speed can also be directly determined.

As described before, there are several ways for determining the aforementioned parameters; however, the present invention does not limit which particular method is used for determining these parameters, nor does it limit the way in which these parameters are transmitted to the touch controller and/or a main processor or operating system belonging to the touch controller. Once the operating system or an application program has determined the aforementioned four parameters, some or all parameters associated with display contents of the screen can be individually or jointly adjusted. These display contents may include brush strokes, that is, parameters such as the shade and brightness of the color, and the size, breadth and shape of a coloring range can be adjusted.

Since a user needs to hold a stylus in order to control the brush strokes of the stylus, he/she might be sensitive to the pressure at the tip of the stylus. In some cases, in order to ensure the correct input of the pressure values, the user may have to hold the stylus vertically to the touch screen. However, holding the stylus in such a posture for a long period of time is strenuous; it also renders some parameters of the stylus inaccessible. For example, if the tilt angle is zero, that is, the stylus is vertical to the touch screen, then it is impossible to determine the pointing direction of the stylus, and it also makes it difficult to determine the rotation speed of the stylus.

In view of this, a method for calibrating the pressure at the tip of the stylus is urgently in need in order to allow a user to better control the pressure while being able to comfortably hold the stylus at an angle.

Moreover, when a user is using a stylus, if a palm rejection area can be set up according to the habit of the user, error operations caused by the palm can be effectively reduced. Meanwhile, there is a need for reducing the palm rejection area, so that the touch screen can receive touch sensitive commands in other areas than the palm rejection area. In the case of several hands simultaneously operating on a big touch screen, there is a need for setting up an individual palm rejection area for each hand, regardless of whether the hands are right or left hands.

SUMMARY OF THE INVENTION

In accordance with an embodiment of the present invention, a touch sensitive processing method for calibrating a pressure value to a stylus is provided. The touch sensitive processing method may include receiving a pressure value experienced at the tip of a stylus; receiving a tilt angle between the shaft of the stylus and a touch screen plane; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the touch sensitive processing method may further include adjusting a display content parameter of the touch screen based on the calibrated pressure value. In an embodiment, the touch sensitive processing method may further include detecting the pressure value to the stylus based on electrical signals emitted from the stylus received by a plurality of touch sensitive electrodes of the touch screen. In an embodiment, the touch sensitive processing method may further include detecting the tilt angle between the stylus shaft and the touch screen plane based on electrical signals received by a plurality of touch sensitive electrodes of the touch screen emitted from a plurality of electrodes of the stylus.

In accordance with an embodiment of the present invention, a touch sensitive processing apparatus for calibrating a pressure value to a stylus is provided, which may include a sensing circuit and a processor. The sensing circuit is connected to a plurality of touch sensitive electrodes on a touch screen to which the stylus is in proximity/touching. The sensing circuit is configured for detecting a pressure value experienced by the stylus based on electrical signals received by the plurality of touch sensitive electrodes from the stylus. The processor is connected to the sensing circuit and is configured for receiving a tilt angle between the shaft of the stylus and a touch screen plane; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the electrical signals are emitted from a plurality of electrodes on the stylus. The sensing circuit is further configured for detecting the tilt angle based on the electrical signals emitted from the stylus and received by the plurality of touch sensitive electrodes.

In accordance with an embodiment of the present invention, a touch sensitive processing apparatus for calibrating a pressure value to a stylus is provided, which may include a sensing circuit and a processor. The sensing circuit is connected to a plurality of touch sensitive electrodes on a touch screen to which the stylus is in proximity/touching. The sensing circuit is configured for detecting a tilt angle between the shaft of the stylus and a touch screen plane based on electrical signals received by the plurality of touch sensitive electrodes emitted from a plurality of electrodes of the stylus. The processor is connected to the sensing circuit and is configured for receiving a pressure value experienced by the stylus; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the sensing circuit is further configured for the detecting pressure value based on the electrical signals received by the plurality of touch sensitive electrodes emitted from the stylus. In an embodiment, the sensing circuit is further configured for detecting the pressure value based on electrical signals transmitted and received by the plurality of touch sensitive electrodes.

In accordance with an embodiment of the present invention, a touch sensitive system for calibrating a pressure value to a stylus is provided, which may include a stylus for emitting electrical signals, a touch screen with a plurality of touch sensitive electrodes, and a touch sensitive processing apparatus connected with the touch screen. The touch sensitive processing apparatus includes a sensing circuit and a processor. The sensing circuit is connected to the plurality of touch sensitive electrodes and is configured for detecting a pressure value experienced by the stylus based on the electrical signals received by the plurality of touch sensitive electrodes emitted from the stylus. The processor is connected to the sensing circuit and is configured for receiving a tilt angle between the shaft of the stylus and a touch screen plane; and calculating a calibrated pressure value based on the pressure value and the tilt angle.

In accordance with an embodiment of the present invention, a touch sensitive system for calibrating a pressure value to a stylus is provided, which may include a stylus for emitting electrical signals, a touch screen with a plurality of touch sensitive electrodes, and a touch sensitive processing apparatus connected with the touch screen. The touch sensitive processing apparatus includes a sensing circuit and a processor. The sensing circuit is connected to the plurality of touch sensitive electrodes and is configured for detecting a tilt angle between the shaft of the stylus and a touch screen plane based on the electrical signals received by the plurality of touch sensitive electrodes emitted from a plurality of electrodes of the stylus. The processor is connected to the sensing circuit and is configured for receiving a pressure value experienced by the stylus; and calculating a calibrated pressure value based on the pressure value and the tilt angle.

In conclusion of the above, the present invention provides a touch sensitive processing method, apparatus and system that allows a user to better control the pressure at the tip of the stylus while being able to comfortably hold the stylus at an angle.

In accordance with an embodiment of the present invention, a touch sensitive processing method for setting a palm rejection area is provided, which may include setting a vertex of a palm rejection area based on a proximity/touch location of a stylus; setting a rejection area baseline vector extending from the vertex based on a stylus shaft vector of the stylus projected on a touch screen; using an area covered by rotating the rejection area baseline vector around the vertex a clockwise angle and an anticlockwise angle as the palm rejection area; and ignoring any proximity/touch events of external conductive objects detected in the palm rejection area.

In order to effectively reduce the palm rejection area or adjust the relative locations of the palm rejection area and a palm, in an embodiment, the vertex is a point near the proximity/touch location. In an embodiment, the clockwise angle is greater than the anticlockwise angle. In order to simplify calculations, in an embodiment, the rejection area baseline vector extends beyond a display area of the touch screen.

In accordance with an embodiment of the present invention, a touch sensitive processing apparatus for setting a palm rejection area is provided, which includes a sensing circuit and a processor. The sensing circuit is connected with a plurality of touch sensitive electrodes of a touch screen for sensing a stylus and an external conductive object. The processor is connected with the sensing circuit for setting a vertex of the palm rejection area based on a proximity/touch location of the stylus; setting a rejection area baseline vector extending from the vertex based on a stylus shaft vector of the stylus projected on a touch screen; using an area covered by rotating the rejection area baseline vector around the vertex a clockwise angle and an anticlockwise angle as the palm rejection area; and ignoring any proximity/touch events of external conductive objects detected in the palm rejection area.

In an embodiment, the sensing circuit is configured for detecting the stylus shaft vector of the stylus based on electrical signals emitted by a plurality of electrodes of the stylus received by the plurality of touch sensitive electrodes. In order to effectively reduce the palm rejection area or adjust the relative locations of the palm rejection area and a palm, in an embodiment, the vertex is a point near the proximity/touch location. In an embodiment, the clockwise angle is greater than the anticlockwise angle. In order to simplify calculations, in an embodiment, the rejection area baseline vector extends beyond a display area of the touch screen.

In accordance with an embodiment of the present invention, a touch sensitive system for setting a palm rejection area is provided, which may include stylus, a touch screen with a plurality of touch sensitive electrodes; and a touch sensitive processing apparatus. The touch sensitive processing apparatus includes a sensing circuit and a processor. The sensing circuit is connected with the plurality of touch sensitive electrodes for sensing the stylus and an external conductive object. The processor is connected with the sensing circuit for setting a vertex of the palm rejection area based on a proximity/touch location of the stylus; setting a rejection area baseline vector extending from the vertex based on a stylus shaft vector of the stylus projected on a touch screen; using an area covered by rotating the rejection area baseline vector around the vertex a clockwise angle and an anticlockwise angle as the palm rejection area; and ignoring any proximity/touch events of external conductive objects detected in the palm rejection area.

The embodiments for setting a palm rejection area provided by the present invention can effectively reduce error operations as a result of a palm touching the touch screen, and can minimize the size of the palm rejection area so that the touch screen is able to receive touch sensitive instructions outside the palm rejection area. In addition, in the case of several hands simultaneously operating on a big touch screen, the present invention allows an individual palm rejection area to be set up for each hand, regardless of whether the right or the left hand is operating the touch screen.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1:
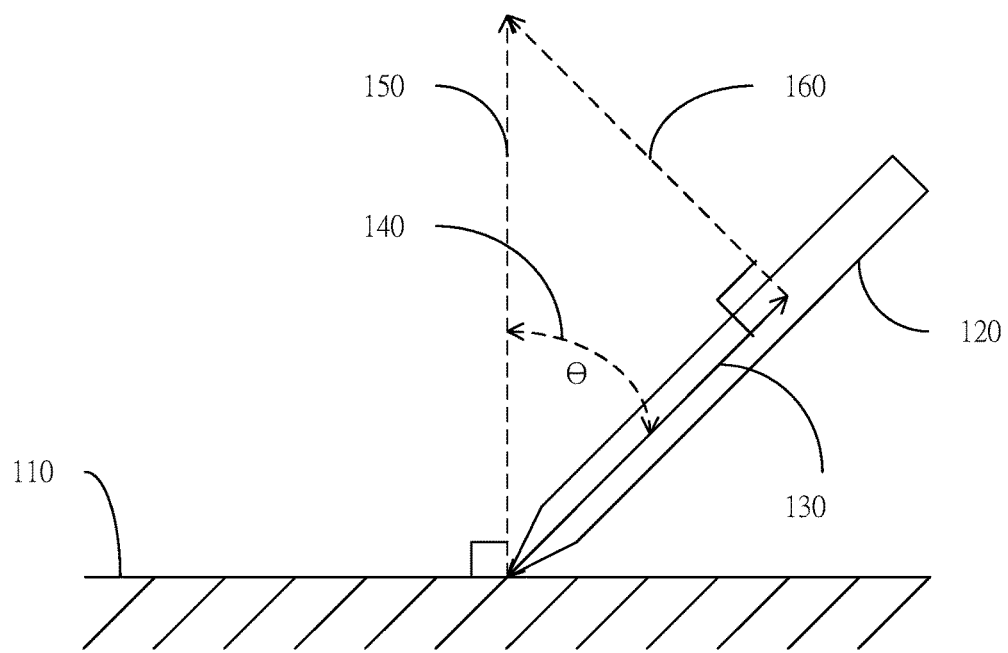
FIG. 1 is a schematic diagram depicting a method for calibrating pressure value to a stylus in accordance with an embodiment of the present invention.

Referring to FIG. 1, a schematic diagram depicting a method for calibrating pressure value to a stylus in accordance with an embodiment of the present invention is shown. FIG. 1 illustrates a cross-sectional view of a touch screen 110 with a stylus 120 thereon. The stylus 120 receives a pressure vector 130 along its body when it comes into contact with the touch screen 110. The pressure vector 130 is at a tilt angle θ 140 to a vertical vector 150 of the touch screen 110. The vertical vector 150 is a combination of the pressure vector 130 and another virtual vector 160, wherein the pressure vector 130 is at right angle to the virtual vector 160.

If a user is holding the stylus 120 vertically with respect to the touch screen 110, the vertical vector 150 can be the pressure that the user wishes to apply to the stylus. However, as the user is holding the stylus 120 at an angle, the pressure value experienced at the stylus 120, i.e. the length of pressure vector 130, is smaller than that of the vertical vector 150. The relationship between the vertical vector 150, the pressure vector 130 and the tilt angle θ 140 can be represented by the following formula (1):

$$\cos θ = \text{Pressure Vector 130/Vertical Vector 150} \quad (1)$$

Since the pressure vector 130 and the tilt angle θ 140 are known, formula (1) can be rewritten as formula (2):

$$\text{Vertical Vector 150} = \text{Pressure Vector 130}/\cos θ \quad (2)$$

If measurement errors are considered, error adjustment can be included in formula (2) to get formula (3):

$$\text{Vertical Vector 150} = \text{Error Value } E + (\text{Pressure Vector 130}) * K/\cos θ \quad (3)$$

Formula (3) can be rewritten as formula (4), wherein f(θ) is a calibration function of the pressure vector that changes with the tilt angle θ 140:

$$\text{Vertical Vector 150} = \text{Pressure Vector 130} * f(θ) \quad (4)$$

Figure 2:
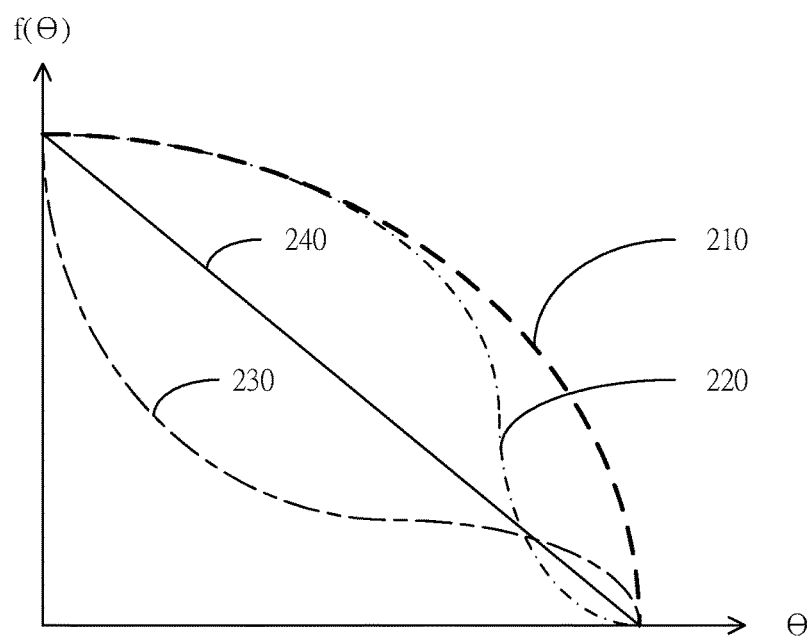
FIG. 2 is a graph depicting calibration functions in accordance with an embodiment of the present invention.

Referring to FIG. 2, a graph depicting calibration functions in accordance with an embodiment of the present invention is shown. A horizontal axis of the graph indicates the tilt angle θ 140, while a vertical axis shows function values of the calibration functions, wherein the tilt angle θ 140 is in the range of 0 to 90 degrees. Four functions 210~240 are shown in FIG. 2, wherein a first calibration function 210 is a cosine function, a fourth calibration function 240 is a linear function, and a second calibration function 220 and a third calibration function 230 can be arbitrary adjusted according to user's need. The above calibration functions can be obtained through formulae or look-up tables. Alternatively, look-up tables can be used followed by interpolation. The interpolation may employ a first-order function, a second-order function or some other function.

In an embodiment, once the touch controller has obtained the measured pressure value and the tilt angle θ 140, it can then perform calculations and/or lookup from lookup tables based on formulae (1) to (3) or the calibration function in formula (4) to obtain a calibrated pressure value.

One with ordinary skill in the art can appreciate that the calibrated pressure value does not necessarily exhibit the relationship shown in FIG. 1. For example, the pressure value after calibration may be a vertical component of the pressure vector 130, and can be represented by formula (5):

$$\text{Calibrated Pressure Value/Pressure Vector } 130 = \sin(90-\theta) \quad (5)$$

In other words, since the pressure vector 130 and the tilt angle θ 140 are known, the following formula (6) can be obtained:

$$\text{Vertical Vector } 150 = \text{Pressure Vector } 130 * \sin(90-\theta) \quad (6)$$

If measurement errors are taken into consideration, error adjustment can be included in formula (6) to obtain formula (7):

$$\text{Vertical Vector } 150 = \text{Error Value } E + k * \text{Pressure Vector } 130 * \sin(90-\theta) \quad (7)$$

Similarly, formula (7) can be represented like formula (4), wherein f(θ) is a calibration function of the pressure vector that varies with the tilt angle θ 140.

When the user is holding the stylus, his/her palm or wrist may also rest on the touch screen. Although in the prior art, there are ways for identifying contact area of a palm or a wrist so that the touch controller can avoid reporting the palm/wrist as touch points. However, these identification methods may be relatively complicated and requires a lot of computation, increasing the power consumption and computational resources of the touch controller. Therefore, after the touch controller obtains the proximity/touch location and pointing direction of the stylus, it may employ a simply elimination process to reject the contact area made by the palm/wrist.

Figure 3:
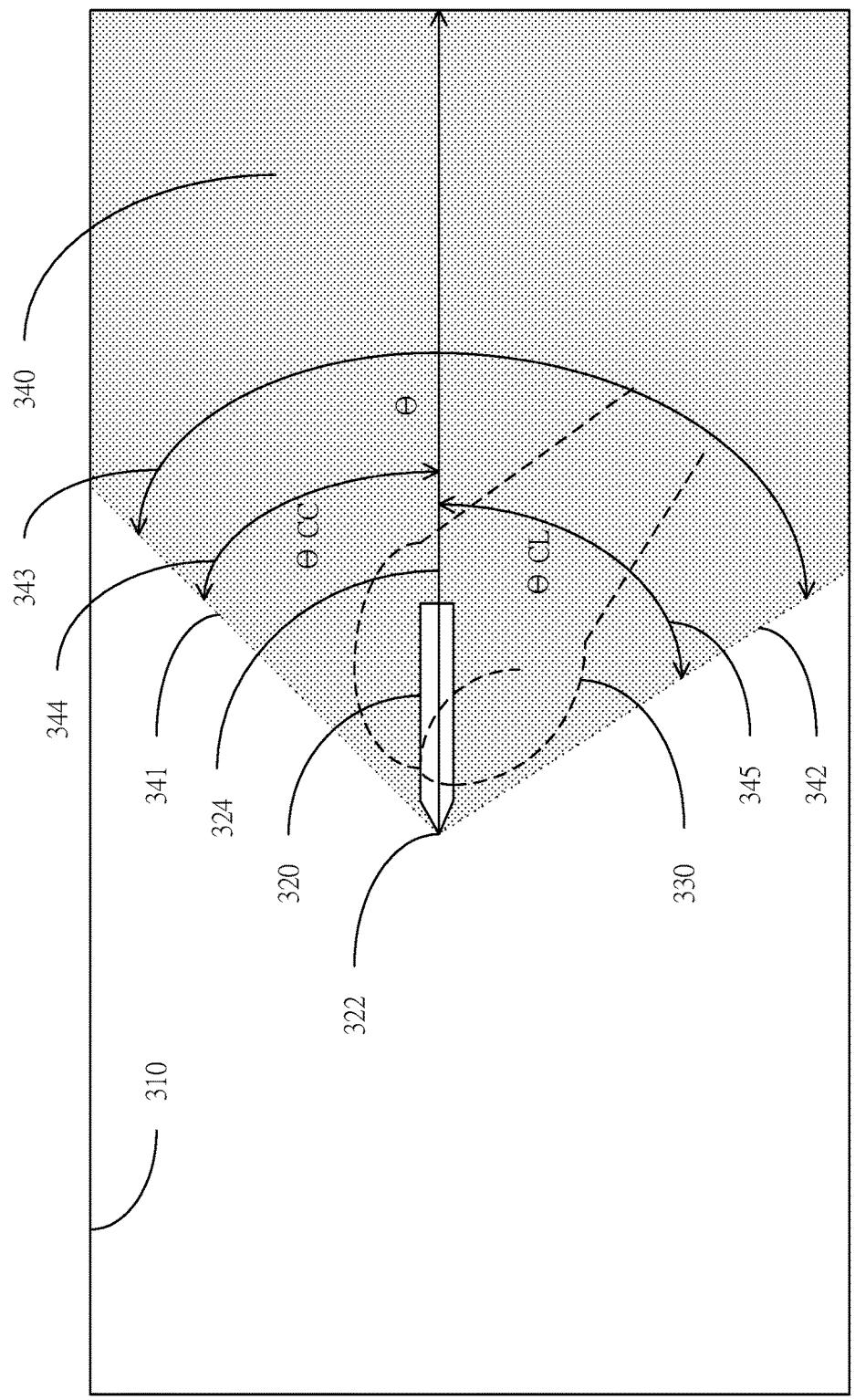
FIG. 3 is a schematic diagram illustrating palm rejection based on the pointing direction of a stylus in accordance with an embodiment of the present invention.

Referring to FIG. 3, a schematic diagram illustrating palm rejection based on the pointing direction of a stylus in accordance with an embodiment of the present invention is shown. FIG. 3 is a top view of a touch screen 310. The right hand 330 of a user is holding a stylus 320, its tip is in proximity to a tip location 322 on the touch screen 310. The tip of the stylus 320 is pointing to the left, implying that the right hand of the user is on the right of the tip location 322. The direction of a stylus body vector 324 is, opposite to the pointing direction, pointing towards the right and extending all the way to the right edge of the touch screen 310.

Using the tip location 322 as the center of a circle, a pentagon palm rejection area 340 can be formed by rotating the stylus body vector 324 anticlockwise by θcc angle 344 and clockwise by θc1 angle 345, wherein a first edge 341 extends from the tip location 322 to the top edge of the touch screen 310, and a second edge 342 extends from the tip location 322 to the bottom edge of the touch screen 310, when viewed from the perspective of FIG. 3. In other words, the angle between the first edge 341 and the stylus body vector 324 is θcc angle 344, and the angle between the second edge 342 and the stylus body vector 324 is θc1 angle 345.

θcc angle 344 and θc1 angle 345 add up to θ angle 343. In an embodiment, θcc angle 344 and θc1 angle 345 are equal to each other. For example, both of them can be 45 degrees. In another embodiment, θcc angle 344 and θc1 angle 345 are not equal to each other, this is more likely due to the shape of human hands. As such, θcc angle 344 is typically less than θc1 angle 345. For example, θcc angle 344 is 15 degrees and θc1 angle 345 is 50 degrees.

With respect to the stylus body vector, the user may arbitrarily set these two angles to any numbers they desire. An approximate palm rejection area can be decided through setting, whether in the case of the user is holding the stylus with the left hand, right hand, or both hands or in some other different ways.

Figure 4:
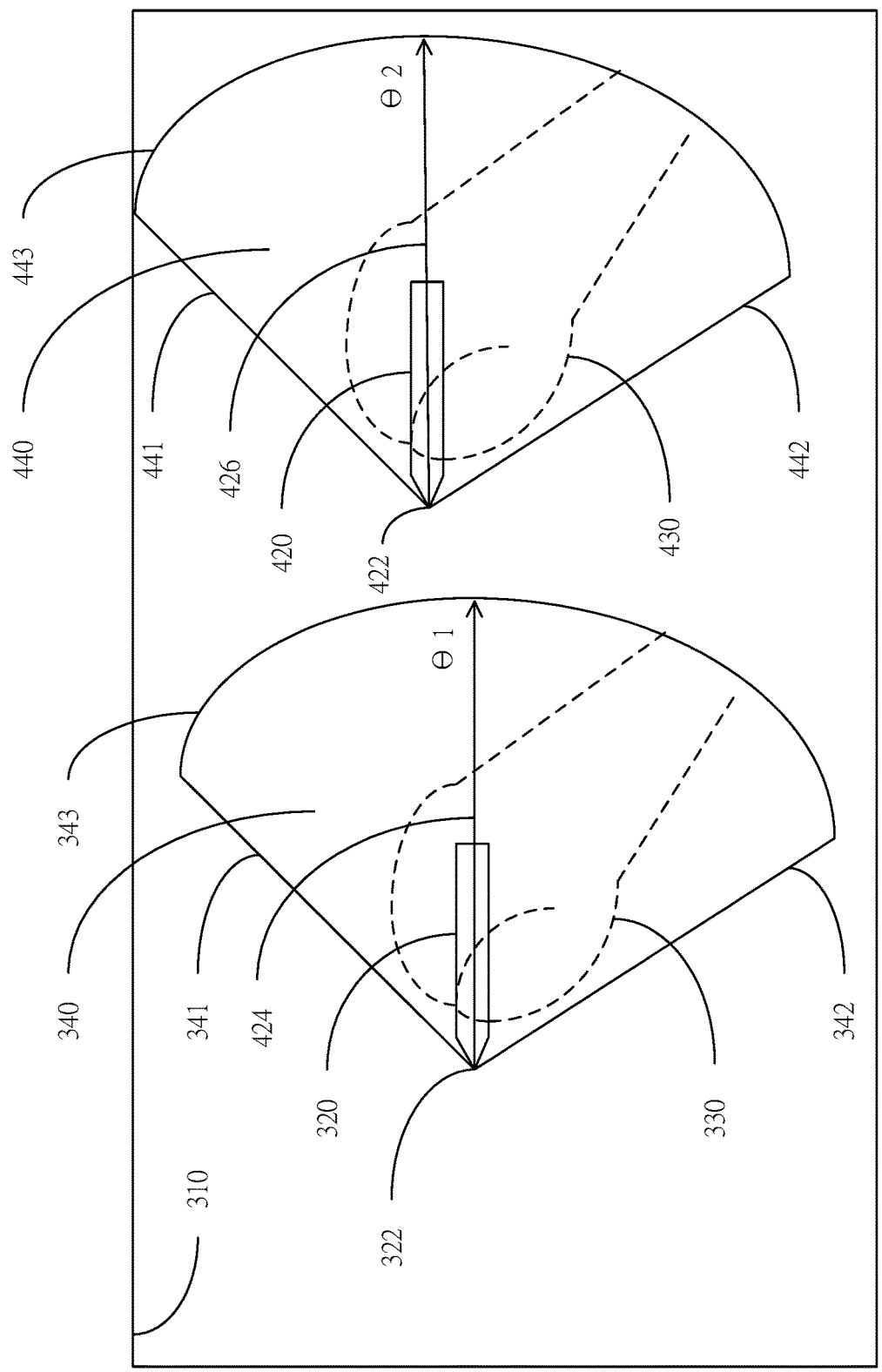
FIG. 4 is a schematic diagram illustrating palm rejections based on pointing directions of styli in accordance with an embodiment of the present invention.

Referring to FIG. 4, a schematic diagram illustrating palm rejections based on pointing directions of styli in accordance with an embodiment of the present invention is shown. The embodiment shown in FIG. 3 shows a circumstance when only one stylus is used, whereas the embodiment shown in FIG. 4 shows a circumstance when a plurality of styli are used.

A stylus 320 shown in FIG. 4 has a corresponding stylus body vector 424 with a length different from that of the stylus body vector 324 shown in FIG. 3. In FIG. 3, the length of the stylus body vector 324 extends all the way to the edge of the touch screen 310, whereas the stylus body vector 424 in FIG. 4 has a fixed length. Similarly, a stylus 420 shown in FIG. 4 has a corresponding stylus body vector 426, which also has a fixed length. The lengths of the plurality of styli 320 and 420 may be the same or different to each other.

In some embodiments, the length of the stylus body vector 424 may be variable. In an embodiment, it may vary with the pressure value. In another embodiment, it may vary with the tilt angle. In yet another embodiment, it may vary with the pressure value and the tilt angle. Similarly, the user may set the length of the stylus body vector and/or the way it varies, and may also set the θcc angles 344 and θc1 angles 345 described before.

Therefore, it can be seen from FIG. 4 that a palm rejection area 340 roughly assumes a fan shape, wherein the tip location 322 is the center of the fan. The palm rejection area 340 includes the stylus body vector 424, and the radius of the fan is the length of the stylus body vector 424. Similarly, a palm rejection area 440 roughly assumes a fan shape, wherein a tip location 422 is the center of the fan. The palm rejection area 440 includes the stylus body vector 426 and the radius of the fan is the length of the stylus body vector 426. Although the two fan-shaped palm rejection areas 340 and 440 shown in FIG. 4 do not exceed the edges of the touch screen 310, but if a fan area exceeds the edges of the touch screen 310, the palm rejection area would naturally become smaller.

In the embodiment of FIG. 4, the tip location of the stylus represents the proximity/touch location of the stylus on the touch screen 310, or a historical location last recorded. In the case where the user lifts the stylus up while user's palm is still maintaining contact with the touch screen 310, the setting for the palm rejection area may follow that for the old (previous) tip location.

In the embodiment of FIG. 4, as the tip locations and the palm rejection areas are detected at different time periods or different methods, when the tip location 422 falls in the palm rejection area 340, the touch controller is still able to detect the tip location 422, and thereby creating the palm rejection area 440.

Figure 5:
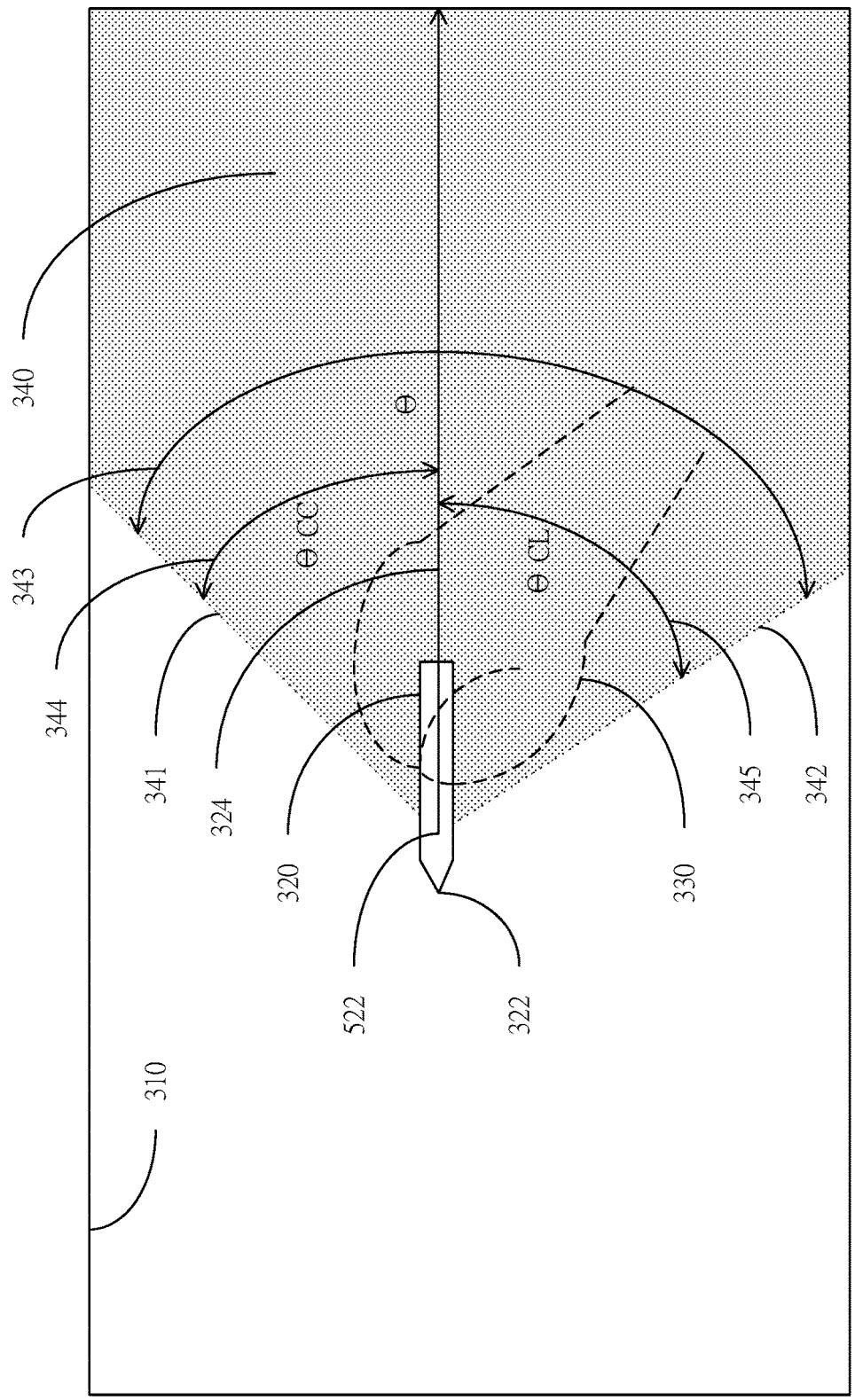
FIG. 5 is a schematic diagram illustrating palm rejection based on the pointing direction of a stylus in accordance with an embodiment of the present invention.

Referring to FIG. 5, a schematic diagram illustrating palm rejection based on the pointing direction of a stylus in accordance with an embodiment of the present invention is shown. In the embodiment shown in FIG. 3, the vertex of the fan-shaped area coincides with the tip location 322, whereas in FIG. 5, the vertex of a fan-shaped area does not coincide with the tip location 322, and it is designated as a fan vertex location 522, and is used as the vertex of the fan-shaped palm rejection area 340.

The fan vertex location 522 may be at a relative location with respect to the tip location 322. For example, the fan vertex location 522 and the tip location 322 may both be on the line of the stylus body vector 324. The distance between the fan vertex location 522 and the tip location 322 may be fixed or variable. For example, the distance between these two locations may vary with the tilt angle. When the tilt angle is zero, these two locations overlap each other. As the tilt angle becomes larger, the distance between the two also becomes larger. The change in the distance can be linear or non-linear. A user can manually set this distance or a vector of the distance between the two locations. The touch controller may obtain the fan vertex location 522 based on the tip location 322 through calculations and/or a lookup table.

Figure 6:
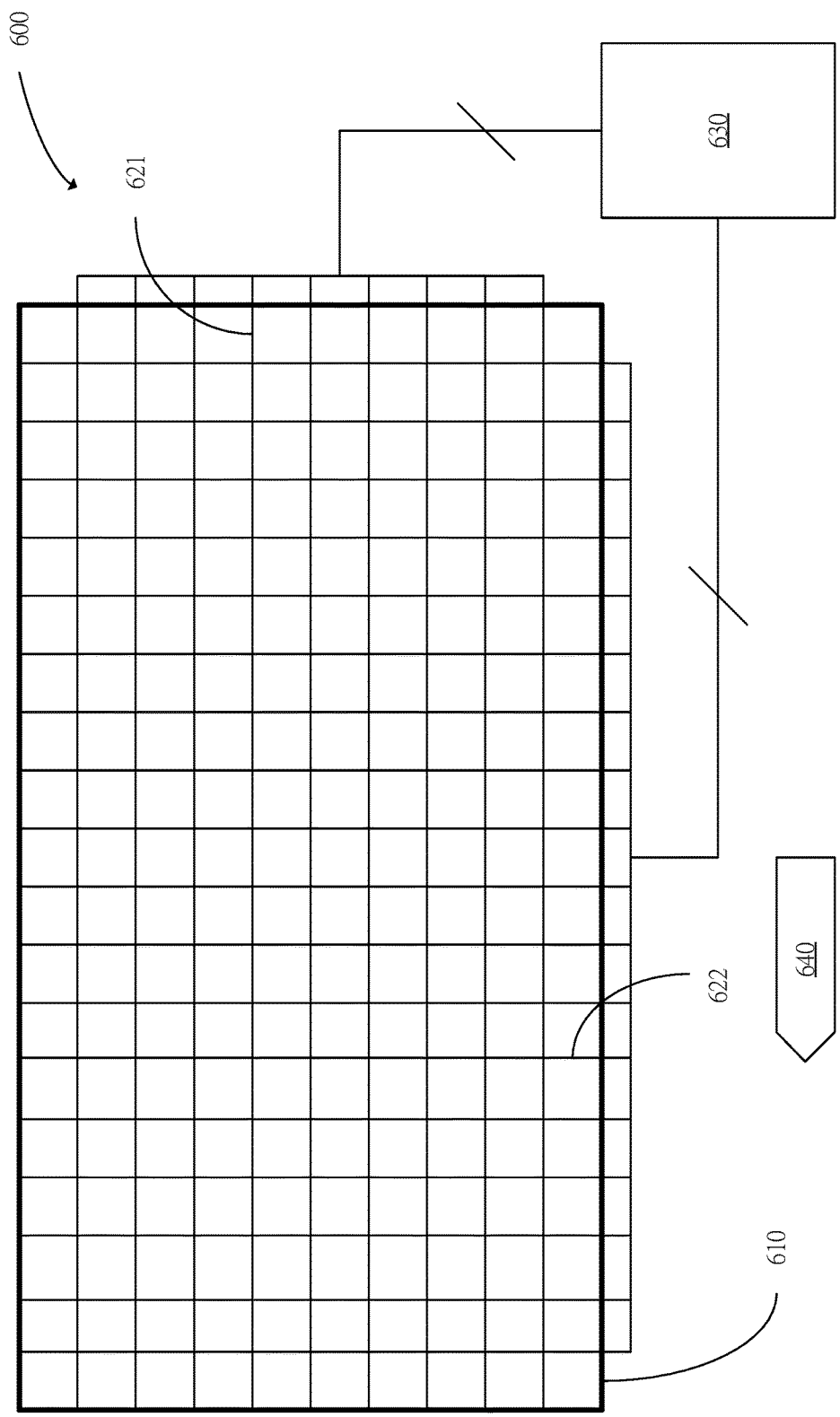
FIG. 6 is a schematic diagram illustrating a touch sensitive system 600 in accordance with an embodiment of the present invention.

Referring to FIG. 6, a schematic diagram illustrating a touch sensitive system 600 in accordance with an embodiment of the present invention is shown. The touch sensitive system 600 includes at least a stylus 640 and a touch screen or touch panel 610. The touch screen 610 includes a plurality of parallel first electrodes 621 and a plurality of parallel second electrodes 622. As shown in FIG. 6, touch sensitive electrodes are typically distributed along the horizontal and vertical axes of the touch screen 610. In this embodiment, the plurality of parallel touch sensitive electrodes extending along the vertical axis are referred to as the first electrodes 621, whereas the plurality of parallel touch sensitive electrodes extending along the horizontal axis are referred to as the second electrodes 622. These first electrodes 621 and second electrodes 622 are typically connected to a touch sensitive processing apparatus 630, which performs mutual-capacitive, self-capacitive and/or stylus touch sensitive control. As described in the prior art, in addition to a proximity/touch location of the tip of the stylus on the touch sensitive system 600, the touch sensitive processing apparatus 630 may obtain one of the four parameters via the electrical signals emitted by the stylus, such as the pressure value, the tilt angle, the point direction and the rotation speed experienced by the tip of the stylus along the stylus shaft.

Figure 7:
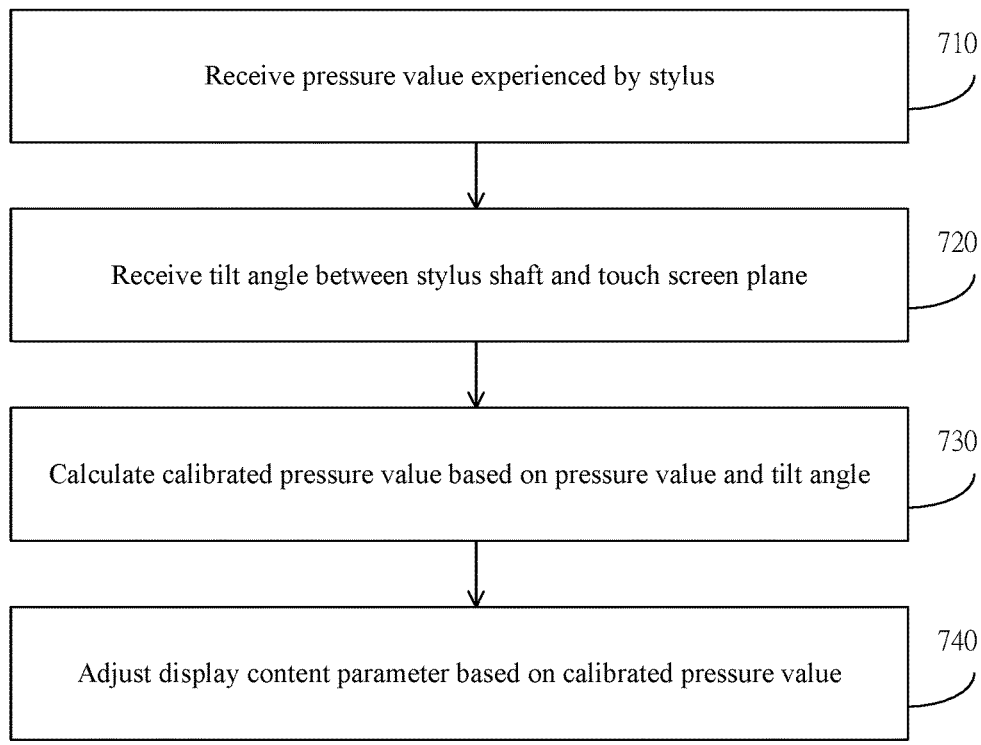
FIG. 7 is a flowchart illustrating steps of a method for calibrating a pressure value to the stylus in accordance with an embodiment of the present invention.

Referring to FIG. 7, a flowchart illustrating steps of a method for calibrating pressure value to the stylus in accordance with an embodiment of the present invention is shown. The method can be performed by the touch sensitive processing apparatus 630 in FIG. 6, or a host computer connected to the touch sensitive processing apparatus 630. Steps 710 and 720 can be carried out in arbitrary order, as long as they are completed before execution of step 730. In step 710, a pressure value experienced by a stylus is received. In an embodiment, step 710 may include a pressure value experienced by a stylus calculated from electrical signals of the stylus received by the first electrodes 621 and/or the second electrodes 622. For example, the electrical signals include signals at two different frequencies, and the pressure value corresponds to the ratio of the signal strengths of these two different frequencies. Alternatively, the stylus may be equipped with a pressure detector that detects a pressure value, which is then converted into an electrical signal through methods such as phase-, amplitude-, frequency- or time-modulation. The touch sensitive processing apparatus 630 can demodulate the pressure value experienced by the stylus based on the electrical signal of the stylus received by the first electrodes 621 and/or the second electrodes 622. In another embodiment, the stylus can transmit a pressure value detected by a pressure detector on the stylus to the touch sensitive processing apparatus 630 or a host computer via a wired module or a wireless module, such as a Bluetooth or a WLAN module. In yet another embodiment, the touch screen 610 is a pressure-sensitive screen or panel capable of detecting pressure thereon, and the touch sensitive processing apparatus 630 can calculate a pressure value experienced by the stylus based on electrical signals transmitted and received by the first electrodes 621 and the second electrodes 622.

In step 720, a tilt angle of the shaft of the stylus with respect to the touch screen is received. The tilt angle may refer to tilt angle θ 140 shown in FIG. 1, or the angle between the stylus shaft and the touch screen plane, i.e. (90−θ) degrees. If the touch screen is curved, the tilt angle may be with respect to a plane of a projected location on the touch screen in proximity/touched by the stylus tip. One with ordinary skill in the art can use simple trigonometric function to convert between sine and cosine functions. In an embodiment, the stylus may include a plurality of electrodes disposed at different locations for transmitting electrical signals. The touch sensitive processing apparatus 630 may calculate relative locations of the plurality of electrodes with respect to the touch screen, i.e. the tilt angle between the stylus shaft and the touch screen plane, based on the electrical signals of the stylus received by the first electrodes 621 and/or the second electrodes 622. In an embodiment, the stylus and an electronic device equipped with the touch screen can include a gyroscope and/or accelerometer for obtaining respective postures of the stylus and the electronic device. Then, the stylus can transmit the electrical signals to the touch sensitive processing apparatus and/or the host via a wired module, a wireless module or its tip. The touch sensitive processing apparatus and/or the host can then calculate the tilt angle between the stylus shaft and the touch screen plane based on the two postures.

In step 730, a calibrated pressure value is calculated based on the pressure value and the tilt angle. As described in formula (2), the calibrated pressure value equals to a ratio of the pressure value to the cosine function of the tilt angle. As shown in formula (3), the calibrated pressure value equals to a ratio of the pressure value to the cosine function of the tilt angle times an error parameter K plus an error value E. The user may adjust the error parameter K and the error value E. As shown in formula (4), the calibrated pressure value equals to the product of the pressure value and a calibration function of the tilt angle. The calibration function can be obtained by a lookup table and interpolation. As shown in formula (6), the calibrated pressure value equals to the product of the pressure value and a sine function value, wherein the sine function value is the result of the sine function of 90 degrees subtracted by the tilt angle. As shown in formula (7), the calibrated pressure value equals to the product of the pressure value, a sine function value and an error parameter K plus an error value E, wherein the sine function value is the result of the sine function of 90 degrees subtracted by the tilt angle.

Step 740 is optional, in which a display content parameter of the touch screen is adjusted based on the calibrated pressure value, including but not limited to, the shade and the brightness of a color; the size, the breadth and the shape of a coloring range. The touch screen may be a touch screen for sensing the stylus.

In accordance with an embodiment of the present invention, a touch sensitive processing method for calibrating a pressure value to a stylus is provided. The touch sensitive processing method includes receiving a pressure value experienced at the tip of a stylus; receiving a tilt angle between the shaft of the stylus and a touch screen plane; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the touch sensitive processing method further includes adjusting a display content parameter of the touch screen based on the calibrated pressure value. In an embodiment, the touch sensitive processing method further includes detecting the pressure value experienced at the tip of the stylus based on electrical signals received by a plurality of touch sensitive electrodes of the touch screen from the stylus. In an embodiment, the touch sensitive processing method further includes detecting the tilt angle between the stylus shaft and the touch screen plane based on electrical signals received by a plurality of touch sensitive electrodes of the touch screen from a plurality of electrodes of the stylus.

In accordance with an embodiment of the present invention, a touch sensitive processing apparatus for calibrating a pressure value to a stylus is provided, such as the touch sensitive processing apparatus 630 in FIG. 6. The touch sensitive processing apparatus includes a sensing circuit and a processor. The sensing circuit is connected to a plurality of touch sensitive electrodes on a touch screen to which the stylus is in proximity/touching. The sensing circuit is configured for detecting a pressure value experienced by the stylus based on electrical signals received by the plurality of touch sensitive electrodes from the stylus. The processor is connected to the sensing circuit and is configured for receiving a tilt angle between the shaft of the stylus and a touch screen plane; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the electrical signals are emitted by a plurality of electrodes on the stylus. The sensing circuit is further configured for detecting the tilt angle based on the electrical signals emitted by the stylus and received by the plurality of touch sensitive electrodes.

In accordance with an embodiment of the present invention, a touch sensitive processing apparatus for calibrating a pressure value to a stylus is provided, such as the touch sensitive processing apparatus 630 in FIG. 6. The touch sensitive processing apparatus includes a sensing circuit and a processor. The sensing circuit is connected to a plurality of touch sensitive electrodes on a touch screen to which the stylus is in proximity/touching. The sensing circuit is configured for detecting a tilt angle between the shaft of the stylus and a touch screen plane based on electrical signals received by the plurality of touch sensitive electrodes emitted from a plurality of electrodes of the stylus. The processor is connected to the sensing circuit and is configured for receiving a pressure value experienced by the stylus; and calculating a calibrated pressure value based on the pressure value and the tilt angle.

In a variant, the calibrated pressure value equals to the product of the pressure value and a calibration function of the tilt angle. In another variant, the calibrated pressure value equals to the product of said product and an error parameter K plus an error value E.

In an embodiment, the sensing circuit is further configured for the detecting pressure value based on the electrical signals received by the plurality of touch sensitive electrodes emitted from the stylus. In an embodiment, the sensing circuit is further configured for detecting the pressure value based on electrical signals transmitted and received by the plurality of touch sensitive electrodes.

In accordance with an embodiment of the present invention, a touch sensitive system for calibrating a pressure value to a stylus is provided, such as the touch sensitive system 600 in FIG. 6. The touch sensitive system includes a stylus for emitting electrical signals, a touch screen with a plurality of touch sensitive electrodes, and a touch sensitive processing apparatus connected with the touch screen. The touch sensitive processing apparatus includes a sensing circuit and a processor. The sensing circuit is connected to the plurality of touch sensitive electrodes and is configured for detecting a pressure value experienced by the stylus based on the electrical signals received by the plurality of touch sensitive electrodes emitted from the stylus. The processor is connected to the sensing circuit and is configured for receiving a tilt angle between the shaft of the stylus and a touch screen plane; and calculating a calibrated pressure value based on the pressure value and the tilt angle.

In accordance with an embodiment of the present invention, a touch sensitive system for calibrating a pressure value to a stylus is provided, such as the touch sensitive system 600 in FIG. 6. The touch sensitive system includes a stylus for emitting electrical signals, a touch screen with a plurality of touch sensitive electrodes, and a touch sensitive processing apparatus connected with the touch screen. The touch sensitive processing apparatus includes a sensing circuit and a processor. The sensing circuit is connected to the plurality of touch sensitive electrodes and is configured for detecting a tilt angle between the shaft of the stylus and a touch screen plane based on the electrical signals received by the plurality of touch sensitive electrodes emitted from a plurality of electrodes of the stylus. The processor is connected to the sensing circuit and is configured for receiving a pressure value experienced by the stylus; and calculating a calibrated pressure value based on the pressure value and the tilt angle.

Figure 8:
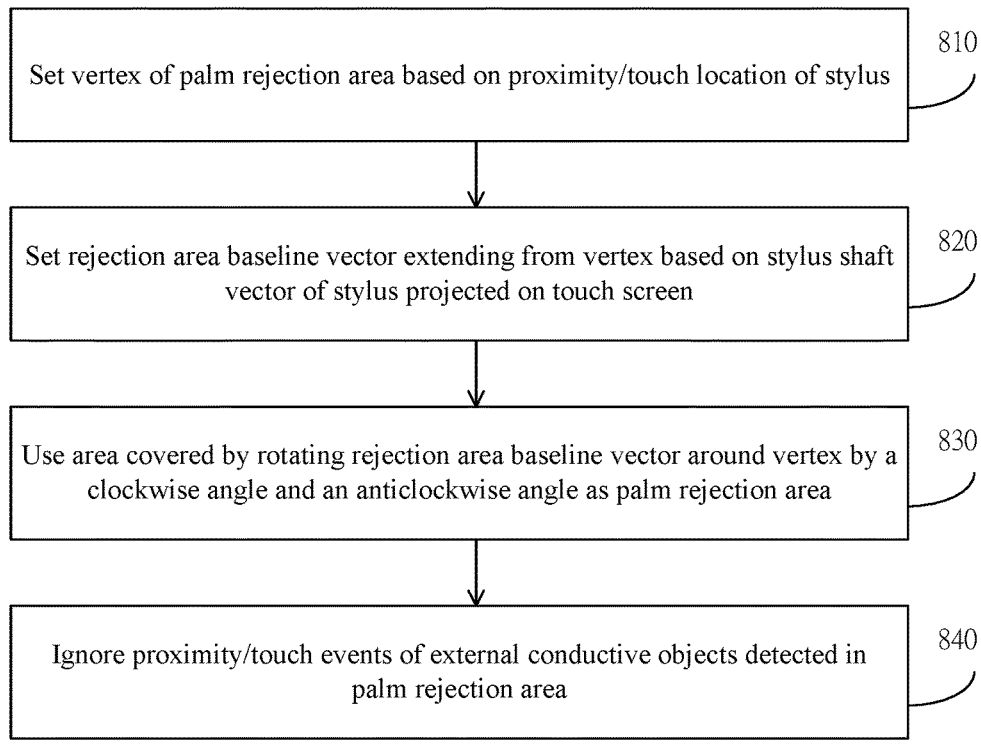
FIG. 8 is a flowchart illustrating steps of a touch sensitive processing method for setting a palm rejection area in accordance with an embodiment of the present invention.

Referring to FIG. 8, a flowchart illustrating steps of a touch sensitive processing method for setting a palm rejection area in accordance with an embodiment of the present invention is shown. The touch sensitive processing method can be implemented using the touch sensitive processing apparatus 630 of FIG. 6. The method includes but is not limited to the following steps. In step 810, a vertex of a palm rejection area is set based on a proximity/touch location of a stylus. In the embodiment of FIG. 3, the vertex is vertex 322. In the embodiment of FIG. 5, the vertex is vertex 522. In other words, the vertex can be the proximity/touch location or a location corresponds to the proximity/touch location, which can be set to a default value or manually by a user.

In step 820, a rejection area baseline vector extending from the vertex is set based on a stylus shaft vector of the stylus projected on a touch screen. The rejection area baseline vector falls on a plane of the touch screen, and can be parallel to the stylus shaft vector, or rotated an angle from the stylus shaft vector. The length of the rejection area baseline vector can be equal to, longer than or shorter than the stylus shaft vector. In the embodiments of FIGS. 3 and 5, the rejection area baseline vector extends beyond a display area of the touch screen. In the embodiment shown in FIG. 4, the rejection area baseline vector is within a display area of the touch screen. The touch sensitive processing apparatus 630 may include a sensing circuit connected to a plurality of touch sensitive electrodes for detecting the stylus shaft vector of the stylus based on electrical signals emitted from a plurality of electrodes of the stylus received by the plurality of touch sensitive electrodes.

In step 830, an area covered by rotating the rejection area baseline vector around the vertex a clockwise angle and an anticlockwise angle is used as the palm rejection area. The anticlockwise angle can be equal to the clockwise angle, or the clockwise angle is greater than the anticlockwise angle.

In step 840, any proximity/touch events of external conductive objects detected in the palm rejection area are ignored. The external conductive objects refer to objects such as palms, fingers or the like. If the object is an active stylus, it is not ignored. In an embodiment, even a passive stylus is not ignored.

In accordance with an embodiment of the present invention, a touch sensitive processing method for setting a palm rejection area is provided, which includes setting a vertex of a palm rejection area based on a proximity/touch location of a stylus; setting a rejection area baseline vector extending from the vertex based on a stylus shaft vector of the stylus projected on a touch screen; defining an area covered by rotating the rejection area baseline vector around the vertex a clockwise angle and an anticlockwise angle as the palm rejection area; and ignoring any proximity/touch events of external conductive objects detected in the palm rejection area.

In order to effectively reduce the palm rejection area or adjust the relative locations of the palm rejection area and a palm, in an embodiment, the vertex is a point near the proximity/touch location. In an embodiment, the clockwise angle is greater than the anticlockwise angle. In order to simplify calculations, in an embodiment, the rejection area baseline vector extends beyond a display area of the touch screen.

In accordance with an embodiment of the present invention, a touch sensitive processing apparatus for setting a palm rejection area is provided, which includes a sensing circuit and a processor. The sensing circuit is connected with a plurality of touch sensitive electrodes of a touch screen for sensing a stylus and an external conductive object. The processor is connected with the sensing circuit for setting a vertex of the palm rejection area based on a proximity/touch location of the stylus; setting a rejection area baseline vector extending from the vertex based on a stylus shaft vector of the stylus projected on a touch screen; defining an area covered by rotating the rejection area baseline vector around the vertex a clockwise angle and an anticlockwise angle as the palm rejection area; and ignoring any proximity/touch events of external conductive objects detected in the palm rejection area.

In an embodiment, the sensing circuit is configured for detecting the stylus shaft vector of the stylus based on electrical signals emitted by a plurality of electrodes of the stylus received by the plurality of touch sensitive electrodes. In order to effectively reduce the palm rejection area or adjust the relative locations of the palm rejection area and a palm, in an embodiment, the vertex is a point near the proximity/touch location. In an embodiment, the clockwise angle is greater than the anticlockwise angle. In order to simplify calculations, in an embodiment, the rejection area baseline vector extends beyond a display area of the touch screen.

In accordance with an embodiment of the present invention, a touch sensitive system for setting a palm rejection area is provided, which includes stylus, a touch screen with a plurality of touch sensitive electrodes; and a touch sensitive processing apparatus. The touch sensitive processing apparatus includes a sensing circuit and a processor. The sensing circuit is connected with the plurality of touch sensitive electrodes for sensing the stylus and an external conductive object. The processor is connected with the sensing circuit for setting a vertex of the palm rejection area based on a proximity/touch location of the stylus; setting a rejection area baseline vector extending from the vertex based on a stylus shaft vector of the stylus projected on a touch screen; defining an area covered by rotating the rejection area baseline vector around the vertex a clockwise angle and an anticlockwise angle as the palm rejection area; and ignoring any proximity/touch events of external conductive objects detected in the palm rejection area.

What is claimed is:

1. A touch sensitive processing method for calibrating a pressure value to a stylus comprising:
   receiving a pressure value experienced by the stylus;
   receiving a tilt angle between a shaft of the stylus and a touch screen plane; and
   calculating a calibrated pressure value based on the pressure value and the tilt angle,
   wherein the shaft of the stylus is straight;
   wherein the calibrated pressure value is a pressure value of a user holding the stylus vertically to the touch screen plane, the calibrated pressure value equals to a product of the pressure value and a calibration function of the tilt angle times an error parameter K plus an error value E, wherein K and E are integers or floating point numbers.

2. The touch sensitive processing method of claim 1, further comprising adjusting a display content parameter of the touch screen based on the calibrated pressure value.

3. The touch sensitive processing method of claim 1, further comprising detecting the pressure value experienced by the stylus based on electrical signals emitted from the stylus received by a plurality of touch sensitive electrodes of the touch screen.

4. The touch sensitive processing method of claim 1, further comprising detecting the tilt angle between the stylus shaft and the touch screen plane based on electrical signals emitted from a plurality of electrodes of the stylus received by a plurality of touch sensitive electrodes of the touch screen.

5. A touch sensitive processing apparatus for calibrating a pressure value to a stylus, comprising:
   a sensing circuit connected to a plurality of touch sensitive electrodes of a touch screen to which the stylus is in proximity or touching for detecting a pressure value experienced by the stylus based on electrical signals emitted from the stylus received by the plurality of touch sensitive electrodes; and
   a processor connected to the sensing circuit for receiving a tilt angle between a shaft of the stylus and a touch screen plane, and calculating a calibrated pressure value based on the pressure value and the tilt angle,
   wherein the shaft of the stylus is straight;
   wherein the calibrated pressure value is a pressure value of a user holding the stylus vertically to the touch screen plane, the calibrated pressure value equals to a product of the pressure value and a calibration function of the tilt angle times an error parameter K plus an error value E, wherein K and E are integers or floating point numbers.

6. The touch sensitive processing apparatus of claim 5, wherein the electrical signals are emitted from a plurality of electrodes on the stylus, and the sensing circuit is further configured for detecting the tilt angle based on the electrical signals emitted from the stylus received by the plurality of touch sensitive electrodes.

7. A touch sensitive processing apparatus for calibrating a pressure value to a stylus comprising:
  a sensing circuit connected to a plurality of touch sensitive electrodes of a touch screen to which the stylus is in proximity or touching for detecting a tilt angle between a shaft of the stylus and a touch screen plane based on electrical signals emitted from a plurality of electrodes of the stylus received by the plurality of touch sensitive electrodes; and
  a processor connected to the sensing circuit for receiving a pressure value experienced by the stylus, and calculating a calibrated pressure value based on the pressure value and the tilt angle,
  wherein the shaft of the stylus is straight;
  wherein the calibrated pressure value is a pressure value of a user holding the stylus vertically to the touch screen plane, the calibrated pressure value equals to a product of the pressure value and a calibration function of the tilt angle times an error parameter K plus an error value E, wherein K and E are integers or floating point numbers.

8. The touch sensitive processing apparatus of claim 7, wherein the sensing circuit is further configured for detecting the pressure value based on the electrical signals emitted from the stylus received by the plurality of touch sensitive electrodes.

9. The touch sensitive processing apparatus of claim 7, wherein the sensing circuit is further configured for detecting the pressure value based on electrical signals transmitted and received by the plurality of touch sensitive electrodes.

10. A touch sensitive system for calibrating a pressure value to a stylus comprising:
  a stylus for emitting electrical signals;
  a touch screen including a plurality of touch sensitive electrodes; and
  a touch sensitive processing apparatus connected with the touch screen including:
    a sensing circuit connected to the plurality of touch sensitive electrodes for detecting a pressure value experienced by the stylus based on the electrical signals emitted from the stylus received by the plurality of touch sensitive electrodes; and
    a processor connected to the sensing circuit for receiving a tilt angle between a shaft of the stylus and a touch screen plane, and calculating a calibrated pressure value based on the pressure value and the tilt angle;
  wherein the shaft of the stylus is straight;
  wherein the calibrated pressure value is a pressure value of a user holding the stylus vertically to the touch screen plane, the calibrated pressure value equals to a product of the pressure value and a calibration function of the tilt angle times an error parameter K plus an error value E, wherein K and E are integers or floating point numbers.

11. A touch sensitive system for calibrating a pressure value to a stylus comprising:
  a stylus for emitting electrical signals;
  a touch screen including a plurality of touch sensitive electrodes; and
  a touch sensitive processing apparatus connected with the touch screen including:
    a sensing circuit connected to the plurality of touch sensitive electrodes for detecting a tilt angle between a shaft of the stylus and a touch screen plane based on the electrical signals emitted from a plurality of electrodes of the stylus received by the plurality of touch sensitive electrodes; and
    a processor connected to the sensing circuit for receiving a pressure value experienced by the stylus, and calculating a calibrated pressure value based on the pressure value and the tilt angle;
  wherein the shaft of the stylus is straight;
  wherein the calibrated pressure value is a pressure value of a user holding the stylus vertically to the touch screen plane, the calibrated pressure value equals to a product of the pressure value and a calibration function of the tilt angle times an error parameter K plus an error value E, wherein K and E are integers or floating point numbers.

\* \* \* \* \*